United States Patent [19]

Reichle et al.

[11] Patent Number: 4,871,515

[45] Date of Patent: Oct. 3, 1989

[54] ELECTROSTATIC FILTER

[75] Inventors: Ernst-Michael Reichle, Karlsfeld; Matthias Seel, Munich, both of Fed. Rep. of Germany

[73] Assignee: MAN Technologie GmbH, Munich, Fed. Rep. of Germany

[21] Appl. No.: 210,422

[22] Filed: Jun. 22, 1988

[30] Foreign Application Priority Data

Jul. 16, 1987 [DE] Fed. Rep. of Germany ....... 3723544

[51] Int. Cl.[4] .............................................. F01N 3/10
[52] U.S. Cl. ...................................... 422/174; 55/131; 55/151; 55/154; 55/466; 60/275; 60/303; 60/311
[58] Field of Search ............. 55/131.2, 151, DIG. 30, 55/154, 466; 60/275, 303, 311; 422/128, 180, 174

[56] References Cited

U.S. PATENT DOCUMENTS 3,157,479 11/1964 Boles ............................ 55/DIG. 30
3,526,081 9/1970 Kusters ................................ 55/131
4,313,739 2/1982 Hamilton .............................. 55/151
4,380,900 4/1983 Linder et al. ........................ 55/131

FOREIGN PATENT DOCUMENTS 0256325 2/1988 European Pat. Off. .............. 60/299
156277 10/1979 Japan .................................. 55/151
2413 7/1982 Japan .................................. 60/275

Primary Examiner—Bernard Nozick
Attorney, Agent, or Firm—Roberts, Spiecens & Cohen

[57] ABSTRACT

The invention provides an electrostatic particle filter in the case of which the collecting electrode is structured in order to make possible a reliable separation of the particles from the gases. The collecting electrode is so designed that a number of windshadow areas formed by spaces are provided in which the electrostatically attracted particles are able to be trapped without being entrained by the main current. A powerful corona discharge ensures simultaneous oxidation of combustible particles if the gas current contains oxygen.

20 Claims, 2 Drawing Sheets

ELECTROSTATIC FILTER

BACKGROUND OF THE INVENTION (a) Field of the Invention

The present invention relates to electrostatic filters for cleaning gases comprising electrodes arranged in a housing in order to produce an electric field through which the gas is to be passed for separating the particles from it.

(b) Description of Prior Art

As compared with mechanical filters of porous materials or wire fabric, electrostatic filters have the advantage that the gas passageway through the filter is open at all times and more particularly when such filters are used for cleaning exhaust gases from IC engines no back pressure is produced which interferes with the operation of the engine. The gas flow is caused to pass through an electric field produced by a pair of electrodes and in which the particles contained in the gas are charged and conveyed to a deposit electrode, on which the particles give up their charges however so that they lose their force of attraction and return into the gas current. Therefore a suggestion has been made (see Staub-Reinhalt. Luft 29 (1969) No. 8, August, pages 318 and 319) for the particles to be separated with the aid of electrodes with special trapping properties.

An electrostatic filter with an electrode having trapping properties for IC engines has been proposed in the German patent No. 3,019,991 and its U.S. equivalent U.S. Pat. No. 4,380,990, in which a tubular separating electrode made of perforated sheet metal is placed concentrically around a rod electrode. The exhaust gases are passed through the tube so that the particles conveyed to the separating electrode are entrained with part of the exhaust gas current through the openings of the perforated sheet metal into an external annular space. Finally with this part of the gas current the particles are returned to the IC engine. The overall result is that the particles are trapped and they are prevented from being re-entrained by the main gas current after they have been discharged at the collecting electrode. Such a design is problematical inasfar as the return of soot particles into the IC engine is not possible without supplementary and complex measures needed to prevent rust particles and other sorts of contaminants finding their way from the exhaust pipes into the IC engine with the gases.

SUMMARY OF THE INVENTION

One object of the invention is to create an electrostatic filter which is simple to manufacture and serves to separate the particles from a gas feed. In order to achieve these or other objects of the invention, one or more separating electrodes of the filter are made with such a structure that they are capable of trapping the particles separated thereon.

This enables the particles to be trapped in a very simple manner, that is to say mechanically in the pores, crevices and the like in the structured depositing electrode so that they are removed from the gas current. By the action of heat, for instance, the retained particles may be combusted and thus destroyed. Owing to the structure the surface serving as the deposition surface is enlarged and at the same time there is the formation of a large number of small windshadow areas in which the particles are adhered. The term collecting electrode is used herein in the sense of including designs in which the electrode sensu stricto is combined with a structured component. The deposition surface then extends on the structured component as well.

It is an advantage if the collecting electrode in accordance with the invention constitutes at least a part of the exhaust gas ducting or guiding means within the filter in order to take up a position within the marginal part of the gas current and to ensure the largest possible volume.

In accordance with one possible form of the invention the collecting electrode is made of metal wool. The attracted particles may then become deposited in the metal wool. The selection of the density of the metal wool has an influence on the trapping capacity of the collecting electrode. Knitted or woven wire fabric, stacked perforated sheet metal and metal sponge are also suitable structures to form a particle trapping collecting electrode.

A further form of the invention involves the provision of a structure, as for instance in the form of a spiral, which permits flow of particles in a direction normal to the gas current direction (the direction of separation) and does not permit the motion of particles in the gas flow direction. Such a structure may preferably be in the form of spaced sheet metal annuli placed side by side in the direction of gas flow, and which in the filter simultaneously form the gas ducting means. The sheet metal annuli may advantageously serve to form a spiral which rests against the inner wall surface of a tubular filter housing. This design offers the advantage that the spiral or the stack of sheet metal annuli may also serve to form a trap made of a non-electrically conducting material, within which the electrode as such in the from of a wire or a wire spiral is placed so as to extend therethrough. In this design the wire spiral also serves as a source of heat for the combustion of the particles, for instance by designing it in the form of a heating filament. The particles are moved more or less radially in relation to the wire electrode, are prevented from moving axially by the trap in the axial direction and are burnt by the heating effect.

The particle trap may, in accordance with another feature of the invention, be in the form of netting, wool or the like of metal, ceramic or another material, which is associated with the collecting electrode on the side facing the current. In this case the particles become entrapped in the netting or wool prior to deposit on the collecting electrode. In the case of the use of a material which is a nonconductor for the trap the particles generally maintain their charge so that the forces of attraction between the electrode and the particles are maintained and accordingly the trapping properties are enhanced.

Whatever the particular design of the collecting electrode the particles may be burnt within the same if this is convenient. This will for example be the case if the filter serves for cleaning exhaust gases. In this case the trapped particles are burnt within the collecting electrode by the hot exhaust gases, such combustion possibly being enhanced by the catalytically acting coatings on collecting electrode and/or heating elements. The source of heat is preferably in the form of an electrically heated filament, which is extended through the collecting electrode. Burners or electrical heating members are also possible for the combustion of the particles. The source of heat may also be switched on periodically or ad hoc so that the particles accumulate in the meantime.

In the case of the use of the filters for exhaust gases it may possibly only be necessary to additionally supply heating energy. In order to be able to keep the heating temperature as low as possible it is possible for the heating periods to coincide with the periods of full load operation, since the exhaust gas temperature is then relatively high.

In accordance with a further feature of the invention the trapping properties may be further enhanced if the collecting electrodes are so arranged in the filter housing that part of the gases to be cleaned may be conducted through the collecting electrode.

This part of the current is preferably re-united with the main current after passing through the collecting electrode. This makes it unnecessary to have additional ducting for the abolition of the part of the gas current. This is done either directly at the end of the collecting electrode within the filter housing or using a separate space, which is in communication with the outlet for the cleaned gas.

In the case of combustible particles present in oxygen containing gases, as for instance in the case of the exhaust gases from fireboxes, and diesel engines, it is possible to employ means by which the time the particles are in the electric field may be prolonged and using a powerful corona discharge so that the oxygen is ionized, and while the particles are collected in the neighborhood of the collecting electrode they are combusted by the reactive ions accelerated in the electric field. The filter thus tends to fulfill the function of a reactor rather than that of a filter, since the particles are not separately discharged from the gas but are directly destroyed. The thermal energy needed for this is either introduced with the gases, as for instance in the case of exhaust gases, or is supplied by separate sources of heat.

This design is particularly suitable for use in motor vehicles with diesel engines, an exhaust gas cleaning system being created which operates solely with a reactor filter without any additional source of heat, no further devices being needed to remove water material and to clean the filter.

In order to prolong the time the particles dwell in the electrical field it is possible to provide particle traps in the neighborhood of the collecting electrode or to design the collecting electrode in the form of a particle trap itself. Details of such possible designs will be described later.

In order to cause a strong corona discharge to take place one or more thin wires are preferably used whose diameter is in each case less than 0.15 mm in order to prevent deposit of the particles on the spray electrode.

In accordance with a further form of the invention the corona current is increased by needles, pointed members or whiskers arranged along the electrode wire, such whiskers if used being formed by deposition from a gas phase. It would also be possible to arrange short thin wire sections so that the electrode would have a construction like that of a bottle brush of very fine metallic wire.

The powerful corona discharge may also be only turned on at certain times in combination with the design using structured collecting electrodes. In this case the system will as a rule operate as an electrostatic filter and on turning on a higher potential the particles are oxidized when needed. The high corona discharge with its oxygen ionizing action thus constitutes an alternative to the additional heat sources.

The invention will now be described in more detail with reference to the drawings which diagrammatically show working embodiments thereof.

BRIEF DESCRIPTION OF THE SEVERAL FIGURES OF THE DRAWINGS

DETAILED DESCRIPTION OF WORKING EMBODIMENTS OF THE INVENTION

Figure 1:
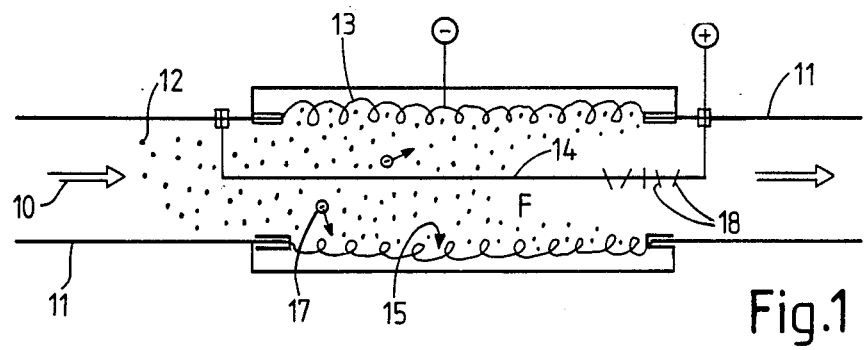
FIG. 1 shows an arrangement to generally illustrate the principle of the invention.

Reference should first be had to FIG. 1 for the following description of the principles of the invention. The gases 10 to be cleaned are passed via a tube 11 into the outside atmosphere or into some form of apparatus which is not shown. In order to separate the particles 12 contained in the gas 10 from the latter it is passed through an electric field F in a section of the gas tube 11. The field is produced by means of a pair of electrodes 13 and 14. At least one of the electrodes is designed with a certain roughness, porosity or as a loose wire structure so that the particles contained in the gas may be trapped in such structure. As the gas 10 flows through the electric field the particles are electrically charged and attracted by the electrodes 13 and 14. Owing to the porous structure of the electrode 13 the attracted particles 12 are trapped within this structure and are thus separated from the gas current 10. The porous structure of the electrode 13 forms to a certain extent a plurality of small open chambers 15 which form windshadow areas, in which the particles 12 are protected even after the discharge thereof on contact with the electrode against the main current of gas 10 and are thus not entrained thereby.

The aim of this construction is to ensure on the one hand that the cross section of the gas tube 11 is not restricted by the filter element and on the other hand that the particles are "sucked" off from the unchanged current, this being achieved by the structured electrode 13 in conjunction with the electric field F. In this respect it is possible for one or more electrodes to be designed as collecting electrodes with a structured design. It is not important whether, as seen macroscopically, the structured collecting electrode is in the form of a plate, of a tube or other configuration. The important point is that it has a pronounced structure and is arranged so as to be in contact with the gas current. In this respect the collecting electrode may be made up of two components, that is to say one electrode in the form of a plate, a tube or a piece of wire, in combination with a porous structure which is arranged, in terms of the direction of particle conveyance, upstream from the electrode. Such a collecting electrode simultaneously performs a trapping function.

A second embodiment of the invention provides a reactor operating by means of a non-homogeneous electric field, with which the particles and the gas components are converted. The design of the reactor is in principle comparable with the above-mentioned electrostatic filter. The reactor or reactor-filter is on the basis of a spray electrode 14 placed at a very high potential in such a manner that the corona discharge is so strong that oxygen is converted into oxygen ions and/or ozone ions 17, which are accelerated in the electric field and when they impinge on the particles 12 they are able to oxidize such particles which are combustible owing to their high reactivity. The reactor-filter is thus suited for such applications in which combustible particles are to be separated from a gas. The oxygen needed for the reaction process is separately supplied (as for instance air) if it is not already comprised in the gas current to be cleaned. This filter or reactor is more especially suitable for vehicles for cleaning diesel exhaust gases since such exhaust gases contain residual oxygen and combustible particles, that is to say soot particles. Furthermore such gases are at the high temperatures needed for the reaction. The spray electrode 14 is made up of at least one very thin wire, on which it is not possible for any particles 12 to be deposited. In order to increase the corona current the wire 14, as will be seen from the right hand half of FIG. 1, is provided with finer transverse wire sections 18, which may be other points.

The designer of such a reactor-filter will have to take measures to see that the residence time of the particles in the electric field is such that it is sufficient for the desired combustion of the particles. The necessary residence time, which is empirically ascertained, and the measures for prolonging it depend on the particular application. In many cases it will be possible to keep the gas flowthrough rate in the reactor-filter at a suitably low value. In the present cases however this measure is not possible or is at least uneconomic. In the present case structural measures are appropriate for ensuring that the particles are retained, as for example by means of a structured form of the collecting electrode, as will be described in what follows in conjunction with the first embodiment of the invention.

Figure 2:
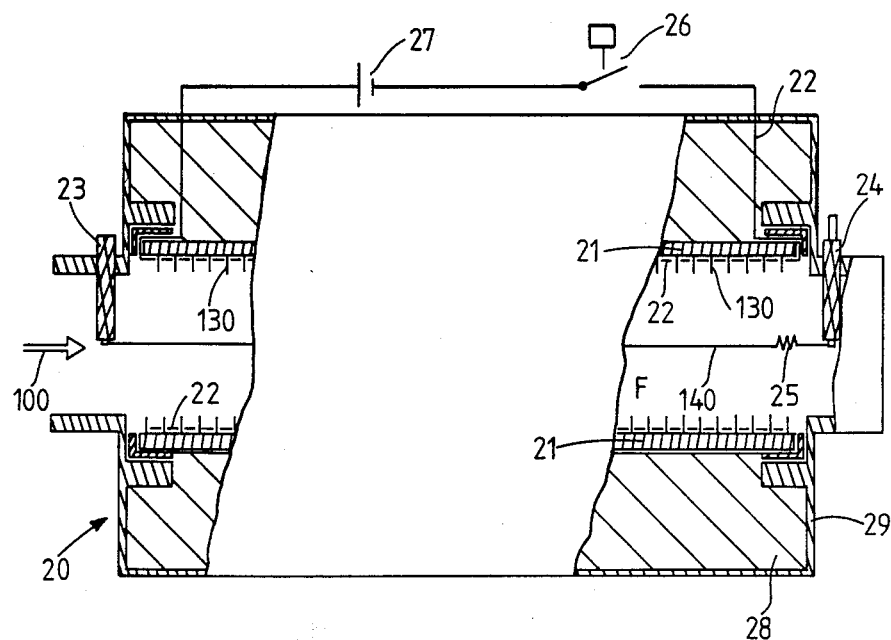
FIG. 2 shows an example of the invention with a structured collecting electrode using a cylindrical particle filter.

The design of a structured collecting electrode is diverse. FIG. 2 shows one example in which a cylindrical particle filter 20 is provided, which has an axially arranged corona electrode 140 and a collecting electrode 130 with a spiral structure and which as seen macroscopically is tubular. Such collecting electrode 130 delimits the current path 100 within the filter 20. The spiral structure of the electrode 130 may be formed by a broad metal tape or band and spirally applied to the inner wall surface of a tube 21 which may for instance consist of ceramic. The collecting electrode 130 has a heating element 22 extending spirally through it. The corona electrode 140 is anchored to the filter housing by means of insulators 23 and 24 and is held taut by means of a spring 25.

During operation of the filter 20 the spray electrode 140 is supplied with high voltage via a terminal 11 and the spiral heating element 22 is connected with a power supply 27. The spiral heating element 22 may be continuously operated or may be switched on ad hoc or periodically using an adjustable switch 26. When the particle-laden gas 100 passes through the electric field F, the particles deposit on the spiral structure 130 and are burned there by the spiral heating element 22. The corona electrode 140 is made of such a thin wire that no particles may become deposited on it. A thermal insulator 28 fills the space between the holding tube 21 for the collecting electrode and the filter housing.

In a modified form of this arrangement the spiral structure of electrode 130 may constitute a part of the tube 21, whereas the heating element 22 simultaneously forms the electrode per se. A ceramic tube 21 with deep, spirally extending grooves would be able to form a support structure with the groove walls 130 forming the main features of such spiral structure, the electrode heating element 22 being arranged in such grooves.

Figure 3:
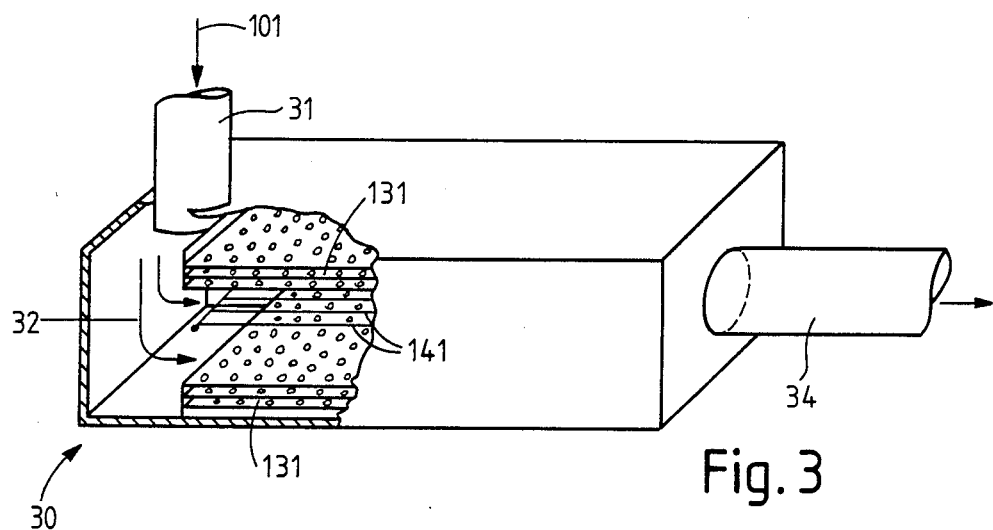
FIG. 3 shows a form of the invention with plate-like collecting electrodes consisting of perforated sheet metal in stacks.

FIG. 3 shows a design with plate-like collecting electrodes, which are made up of stacks of perforated sheet metal. In the center of the filter 30 there is a first electrode consisting of a plurality of wires 141. The gas entering the filter 30 via a connector 31 is caused to flow between the collecting electrodes 131, the particles being conveyed to the collecting electrode 131 and being trapped within the sheet metal stacks. The cleaned gases flow via a second connector 34 out of the filter.

The perforated sheet metal parts of each respective collecting electrode 131 are connected in an electrically conducting manner in the design of FIG. 3 so that they all have the same effect on the particles. A differential effect may be mechanically produced by having a different density of the perforations or having a different ratio between the perforation area to the area of the electrodes. One possible modification is possible in which the respective perforated metal sheet delimiting the gas current is designed with a higher perforation density or a substantially larger ratio between the perforation area and the area of the sheet metal in order to keep down the deposition at such sheet metal elements, more especially since particles deposited here may be readily entrained again. A similar effect may be achieved if the voltage increases from plate to plate so that the electrical suction effect is increased into the interior of the stack of sheet metal elements.

In accordance with a further embodiment the perforated plates adjoining the current are not supplied with the voltage but are connected via electrically insulating connections (not shown) with the (outer) electrode plates which are the electrode in the limited sense of the word. In this manner the perforated plates adjoining the current have a screening function in relation to the gas current 32 so that they prevent the impinging gas current 32 reaching the particles deposited on the electrodes to the rear. In such a case the perforated plates adjoining the current may be made of an electrically nonconducting material. The outer plate of the respective collecting electrode 131 may also be free of perforations.

Figure 4:
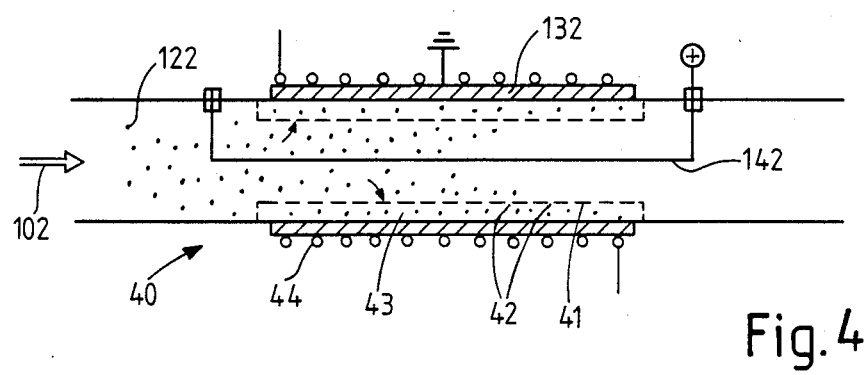
FIG. 4 shows a form of the invention with a tubular collecting electrode in the filtering zone.

FIG. 4 shows a further design in which there is a tubular collecting electrode in the filter zone 40. This electrode has a smooth, corrugated or slightly structured surface and wire netting 41, which is placed clear of the electrode 132 at a certain distance therefrom as a particle trap.

Owing to the active force exerted by the electrode 132 the particles 122 move out of the gas current 102 through the openings 42 in the wire netting 41 and so arrive in the windshadow area 43 between the wire netting 41 and the electrode 132. The wire netting 41 placed clear of the electrode or ahead of it is intended to ensure that the particles 122 depositing at the electrode 132 are not entrained again by the gas current 102. The wire netting 41 and the electrode 132 may be placed at the same electrical potential. It is however possible to have a potential differential between them so that the particles are additionally accelerated towards the electrode.

Figure 5:
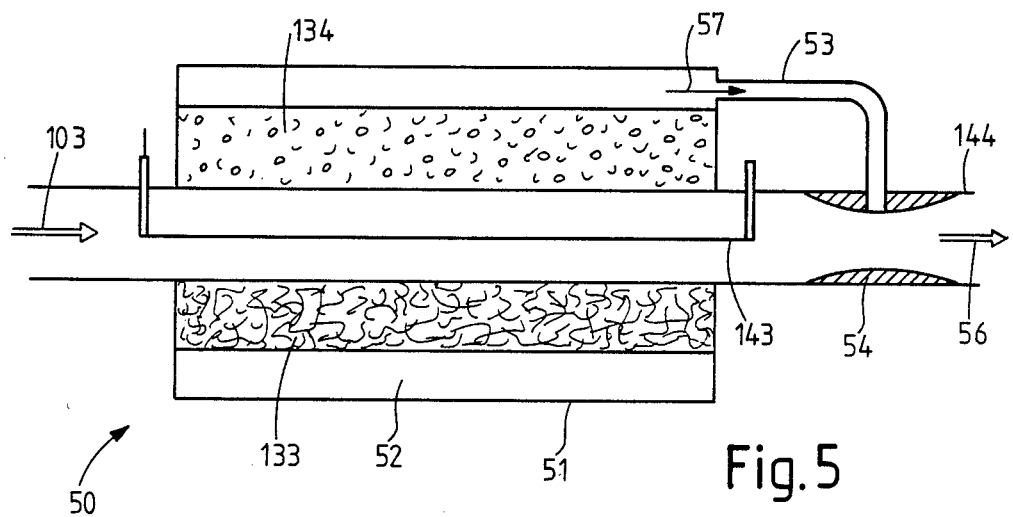
FIG. 5 illustrates a form of the invention with metallic wool and metal sponge.

Further possible designs of the structured collecting electrodes involve the use of a metal wool braid or fabric 133 or a metal sponge 134 (see FIG. 5).

There are many different possibilities as regards the structure and also the geometry or configuration of the collecting electrodes. For instance, independently of their structure, the collecting electrodes may be tubular or plate-like or have any other different form as may be required by the particular application in question. In the case of designs with particle traps the material for the particle trap will be selected with a view to the economic and application aspects. In the case of cold gases, plastics, textiles and the like are possible, while in the case of hot gases refractory materials such as metal, ceramic and the like may be used.

In the case of hot gases, as for instance the hot exhaust gases coming from an IC engine, the particles are mainly combustible. Such particles are generally and preferably burned after being separated from the gas, the heat of the gases being used as well for this. Such a combustion process may be promoted by coating the collecting electrodes with a catalytically acting layer. Dependent on the type of catalyst used, the catalytically acting coating may directly promote the combustion of soot particles (catalyst in the form of oxides of non-noble metals) or indirectly (noble metal catalyst). In the case of a noble metal coating (as for instance of platinum) the process takes place via the oxidation of the hydrocarbons and carbon monoxide. The gaseous forms of the contaminants in the exhaust gas are thus simultaneously reduced. The temperature may be increased to the desired value by wire heating elements passing through the collecting electrodes. In the case of the tubular collecting electrode 132 as in FIG. 4 the heating of the gas takes place with the aid of the wire heating element 44, which extends in the form of a spiral through the collecting electrode 132.

As a rule part of the current of gas to be filtered will flow into the collecting electrode in order to then flow back into the main current at the downstream end of the filter. This part of the current contributes to moving the attracted particles into the pores or cavities of the electrode structure. This effect may be enhanced if the part of the current is drawn off radially and removed, for instance in the case of a tubular collecting electrode. FIG. 5 for instance shows that an intermediate space is provided between the collecting electrode 133 or 134 and outer wall 51 of the filter housing 50. This space 52 is connected via a connecting tube 53 with the exit tube 144 for the main current downstream from the filter 50. In order to achieve an aspirating effect via the connecting tube 53 the removal tube 144 may be decreased in diameter (at 54) as a venturi at the point of opening of the connection means.

All the designs of the invention described so far may be constructed in the form of a reactor filter by applying a sufficiently high potential to the respective spray electrode 14, 140, 141 and 142. An additional source of heat will not be needed in applications in which sufficiently hot gases are passed through the electric field. By the use of suitable catalytic coatings the chemical reaction may be influenced quantitatively and also qualitatively.

In accordance with a further form of the invention the filter consists of at least one particle trap which is so arranged in the filter housing that the gas current to be cleaned generally only sweeps over it as it moves past, a small part of the gases enters the particle trap. The particle trap consists of a porous structure such as wool, fiber or wire fabric, perforated plates, sponge members or combinations of such members, in whose pores the particles from the gases may be deposited. The particles are moved into the particle trap either as the parts of the current moving through the particle trap or by the pulsation of the gas or by a combination thereof.

The result is then a mechanical filter in the case of which the gases are cleaned while at the same time having a free passage through the filter and without being prevented from flowing by deposits of particles therein. The design of the particle trap makes it possible for the filter action to be determined. That is to say the degree of porosity, the length of the particle trap, along which the gas current moves, and the arrangement of the particle trap in the gas current essentially influence the filter action, the design data being ascertained empirically for the given application in question.

In accordance with one design of the arrangement in accordance with the invention there is a plurality of particle traps arranged in tandem in the direction of gas flow, the gas flow being divided at each particle trap, that is to say split up into one gas current which moves through the particle trap one or more times, and a part of the current which bypasses the particle trap, the two parts of the gas current being re-united downstream from the particle trap.

Pulsation of the gas will make it possible for small amounts of gas to be moved locally into the particle trap and then moved back into the main gas current, the particles being retained as the gas comes out of the particle trap again. This takes place at the entire filter area facing the gas current and along the flow path within the filter. The filter or the particle trap or traps are thus equally charged with particles.

If there is no gas pulsation or turbulence small parts of the current may be passed through the particle trap and re-united with the main current after passing through.

In the case of applications in which the gas does not flow in a pulsating current or if the gas oscillations are too small, as in the case of firebox plant, means may be used such as resonators or the like in order to produce pressure waves in the current.

This filter equipped with particle traps has the advantage over electrostatic filters that it may be used for the filtering of particles which are not able to be electrically charged. Filters of this type are more especially suitable for cleaning the exhaust gases of IC engines, in the case of which the exhaust gas current is already pulsating. Owing to the pressure surges there are local pressure fluctuations and thus multidirectional gas pulsations, the particles being entrained into the particle trap thereby and retained on the pore walls.

In the case of combustible particles the filter may be combined with an electric field which is used for regenerating the filter and may be switched on when needed or periodically. In this case it is possible to use a pair of electrodes with at least one wire electrode, which is placed at a very high potential so that its corona discharge is capable of ionizing oxygen from oxygen containing gas and to combust the particles trapped in the trap. The electric field or the potential is only applied for a short time and is not used for the filtering operation but for the oxidation process.

For this general-purpose, filter designs are suitable as are shown for instance in FIGS. 1, 3 and 5, and which may be primarily thought of as being used without spray electrodes 14, 141 and 143. In FIG. 1 the gas 10 enters the filter housing via the pipe 11 so that as seen macroscopically it flows through tubular particle traps 13 axially. By using adjustable chokes, not illustrated, or owing to the strokes of an IC engine generating it, the gas will flow through the filter in pulses so that flows directed against the particle trap 13 will also be present and the particles 12 of such flows may be trapped in the open chambers 15 of the particle trap. The degree of separation may be influenced by varying the length of the particle trap tube. Furthermore the design of the structure and of the diameter of the particle trap has an effect on the efficiency of separation of the particle from the gases. These data are ascertained experimentally in accordance with the use and configuration of the filter.

Furthermore the use of plate-like particle traps 131, as shown for instance in FIG. 3, is possible for general-purpose particle filters. Plate-like particle traps may however also be arranged across the direction of flow of the gases without however fully occupying the flow cross section so that part of the flow is able to flow round and sweep over the surface of the particle trap. In this case it is expedient to place a plurality of plates one after the other and to guide the part of the flow moving round the plates between the plates as well.

It is important that a main gas current, which constitutes generally half the amount of gas moving through the filter, is able to surround the filter member or the particle trap, there being a gas exchange between the fraction of the gases flowing through the particle trap and the main current. It has been seen that it is in this manner that the particles contained in the gas may be mechanically trapped, that is to say are able to be separated from the gas without essentially impairing the motion of gas through the filter.

The part 57 of the gas current moving through the particle trap 134 and 133 may be ducted in such a manner as shown in FIG. 5 that it is only returned to the main current 56 downstream of the filter 50. In other cases the introduction and removal of the gas into and from the particle trap is along the entire particle trap.

The removal of material from the particle traps will take place in a manner suitable for the particular application. In cases where this is possible, the particle trap or the filter will simply be replaced and possibly mechanically cleaned. If the particles are combustible, the same may be burnt by the supply of heat. A particularly suitable method is the use of ionizing field F within the filter, as has been described above and which is switched on periodically or switched on for a short time when a measurement of an operational parameter indicates that this is necessary. The ions produced and accelerated in the field F are retarded by the particles collecting in the particle trap and the kinetic energy converted into thermal energy leads to oxidation of the particles.

Figure 6:
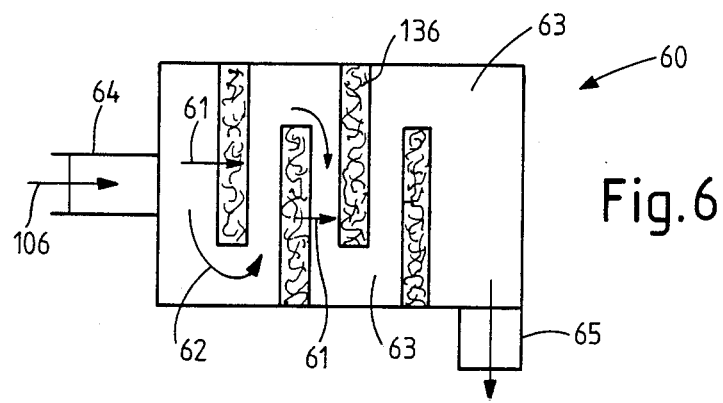
FIG. 6 shows a filter with staggered plates.

FIG. 6 shows a further working example of the invention in which a number of particle traps 136 are arranged in the filter housing 60 which are made up of metal wool, perforated plates or similar porous material so as not be parallel to the macroscopic direction of flow but rather oblique thereto. The plate-like particle traps 136 have a size smaller than the cross section of the filter housing 60 and are arranged in tandem with a clearance therebetween so that part 62 of the gas 106 to be cleaned may flow through sweeping along and surrounding the particle traps from the inlet connector 64 to the outlet connector 65, while a second part 61 of the current flows through the particle traps 136. After each particle trap 136 the gases of the two parts 61 and 62 of the current are mixed together so that no defined, separate gas flows are formed. The orientation of the plates may be between the parallel and the perpendicular directions in relation to the gas current.

We claim:

1. An electrostatic filter for separating combustible particles from a gas containing oxygen comprising a housing having inlet means for a gas containing oxygen and combustible particles and outlet means for discharge of the gas from which the combustible particles have been separated and burned, two electrodes arranged in said housing for producing an electrostatic field through which a flow of said gas is passed, one of said electrodes being in the form of a collecting electrode constructed with trapping openings and positioned so that combustible particles in the gas are attracted thereto, means for applying a voltage of high potential to the other of said electrodes to produce a corona discharge of sufficient intensity to ionize the oxygen in the gas and produce oxygen or ozone ions which oxidize said combustible particles, and heating means associated with the collecting electrode for providing heat for burning the oxidized combustible particles within the housing, the gas from which the combustible particles have been separated and combusted flowing to said outlet means.

2. The filter as claimed in claim 1 wherein the collecting electrode forms an exhaust gas duct means within the housing.

3. The filter as claimed in claim 1 wherein the collecting electrode comprises metal wool.

4. The filter as claimed in claim 1 wherein the collecting electrode comprises a stack of perforated sheet metal elements.

5. The filter as claimed in claim 1 wherein the collecting electrode consists of an electrically conducting material.

6. The filter as claimed in claim 1 wherein said heating means comprises an electrical resistance heating element.

7. The filter as claimed in claim 1 wherein the collecting electrode is in the form of a sheet structure and wire netting on the electrode facing the gas flow.

8. The filter as claimed in claim 1, said heating means comprising an electrical heating element extending through the collecting electrode.

9. The filter as claimed in claim 1 wherein the collecting electrode is at least partly coated with a catalyst.

10. The filter as claimed in claim 1 wherein the other electrode consists of at least one wire with a diameter less than 0.15 mm.

11. The filter as claimed in claim 1 wherein the collecting electrode is in the form of a tube.

12. The filter as claimed in claim 1 wherein the collecting electrode comprises comprises filter wool, fabric, or a stack of perforated plates.

13. The filter as claimed in claim 1 comprising thermal insulation means between said collecting electrode and said housing.

14. The filter as claimed in claim 1 comprising means for regulating the operation of the heating means, in accordance with deposition of particles on said collecting electrode.

15. The filter as claimed in claim 1 wherein the collecting electrode consists of at least one metallic spiral.

16. The filter as claimed in claim 15 wherein the metallic spiral is arranged in grooves in a refractory electrically insulating holding means.

17. The filter as claimed in claim 1 comprising a tube arranged on the housing to conduct the part of the gas current passing through the collecting electrode back into the cleaned main gas current.

18. The filter as claimed in claim 17 wherein the tube opens into a narrow part of a main gas tube downstream from the housing.

19. The filter as claimed in claim 1 wherein said collecting electrode comprises a plurality of filter plates.

20. The filter as claimed in claim 19 wherein filler plates have said openings arranged with an offset from plate to plate.

* * * * *